(12) United States Patent
Xin et al.

(10) Patent No.: US 9,926,502 B2
(45) Date of Patent: Mar. 27, 2018

(54) CARBONACEOUS SUBSTANCE GASIFICATION SYSTEM AND METHOD

(71) Applicant: ChangZheng Engineering Co., Ltd., Beijing (CN)

(72) Inventors: Wei Xin, Beijing (CN); Honghai Li, Beijing (CN); Ruiheng Gao, Beijing (CN); Yongjin Chen, Beijing (CN); Xiaofei Li, Beijing (CN); Pin Liu, Beijing (CN); Lizhi Li, Beijing (CN)

(73) Assignee: Changzheng Engineering Co., Ltd., Beijing (CN)

( * ) Notice: Subject to any disclaimer, the term of this patent is extended or adjusted under 35 U.S.C. 154(b) by 108 days.

(21) Appl. No.: 15/038,792

(22) PCT Filed: Nov. 21, 2014

(86) PCT No.: PCT/CN2014/091839
§ 371 (c)(1),
(2) Date: May 24, 2016

(87) PCT Pub. No.: WO2015/074591
PCT Pub. Date: May 28, 2015

(65) Prior Publication Data
US 2017/0037330 A1 Feb. 9, 2017

(30) Foreign Application Priority Data

Nov. 25, 2013 (CN) .......................... 2013 1 0607095

(51) Int. Cl.
*C10J 3/84* (2006.01)
*C10J 3/24* (2006.01)
*C01B 3/02* (2006.01)
*C10J 3/48* (2006.01)

(52) U.S. Cl.
CPC .................. *C10J 3/84* (2013.01); *C01B 3/02* (2013.01); *C10J 3/485* (2013.01); *C10J 3/845* (2013.01);

(Continued)

(58) Field of Classification Search
CPC ..................................... C10J 3/26; C10J 3/00
See application file for complete search history.

(56) References Cited

U.S. PATENT DOCUMENTS

| 4,323,366 A * | 4/1982 | Staudinger | C10J 3/08 110/165 R |
| 4,973,337 A * | 11/1990 | Jokisch | C10J 3/84 261/118 |

(Continued)

FOREIGN PATENT DOCUMENTS

| CN | 101570699 A | 11/2009 |
| CN | 201842827 U | 5/2011 |

(Continued)

*Primary Examiner* — Matthew J Merkling
(74) *Attorney, Agent, or Firm* — Fox Rothschild LLP

(57) ABSTRACT

A carbonaceous substance powder gasification system and gasification method. The system comprises a carbonaceous substance reaction apparatus and a gas return apparatus used for raising the pressure of some of a raw syngas cooled and preliminarily purified downstream of the reaction apparatus, then blending with high-temperature raw syngas upstream of the reaction apparatus and reducing the temperature. The method comprises reacting in a gasification reaction apparatus the carbonaceous substance and a gasification agent to generate raw syngas and ash and slag, some of the high-temperature raw syngas moving downstream with fly ash and liquid slag, and some of the high-temperature syngas moving upstream with fly ash; the downstream part of the high-temperature raw syngas being cooled, preliminarily purified and deslagged, then pressurized, and the wet raw syngas being injected into the system and blended with the upstream high-temperature raw syngas; the remainder of the high-temperature syngas moving upstream with fly ash and blending and cooling with the low-temperature wet syngas injected by the preliminary cooler, and optionally being entered into the cooling reaction stage; the cooled or cool- (Continued)

ing-reacted raw syngas continuing upstream, passing through the upper cooling stage and cooling again and ash being removed to obtain the raw syngas.

16 Claims, 1 Drawing Sheet

(52) U.S. Cl.
CPC .. *C10J 2300/093* (2013.01); *C10J 2300/0959* (2013.01); *C10J 2300/1631* (2013.01); *C10J 2300/1807* (2013.01); *C10J 2300/1846* (2013.01)

(56) References Cited

U.S. PATENT DOCUMENTS

| | | | | |
|---|---|---|---|---|
| 5,445,658 | A | * | 8/1995 | Durrfeld ................ C10J 3/485 122/7 R |
| 5,958,264 | A | * | 9/1999 | Tsantrizos ............... C03B 5/005 110/250 |
| 8,118,892 | B2 | * | 2/2012 | Surma ....................... C10J 3/08 423/644 |

FOREIGN PATENT DOCUMENTS

| | | |
|---|---|---|
| CN | 102827640 A | 12/2012 |
| CN | 203700292 U | 7/2014 |
| CN | 203700293 U | 7/2014 |
| DE | 217236 A1 | 1/1985 |

\* cited by examiner

CARBONACEOUS SUBSTANCE GASIFICATION SYSTEM AND METHOD

CROSS REFERENCE TO RELATED APPLICATIONS

This application is a U.S. National Phase of International Application No. PCT/CN2014/091839, filed Nov. 21, 2014, which claims priority to China Application No. 201310607095.9, filed Nov. 25, 2013, the disclosures of which are incorporated herein by reference.

FIELD OF THE INVENTION

The present invention relates to a carbonaceous substance gasification system and method, in particularly, a system and a method to daily process more than 2000 ton of compressed pulverized coal to create synthesis gas.

BACKGROUND OF THE INVENTION

The development of the modern petrochemical industry nowadays is more focusing on large scale production, and the clean coal pulverization technique is directed into the scale expansion of high pressure pulverization equipment. But the existing pulverization equipments all have unsolved issues.

The development of maximizing the single nozzle gasifiers is restricted by the transportation of the coal.

Multiple nozzles gasifiers utilizing synthesis gas up-flowing process can be further expanded. However, the fluid cinder is flowing in a direction which is opposite to the synthesis gas flowing direction, so the moment the fluid cinder fall into the cinder pool, it will create certain amount of low temperature steam, which also flows opposite to the flowing direction of the fluid cinder into the chamber through the cinder exit, so that the temperature of the fluid cinder drops. Therefore, when the fluid cinder unevenly falls, it's usual that the fluid cinder concretes before reaching to the cinder pool. And since the heat is not enough to melt the solid cinder, so the solid cinder accumulates until the cinder exit is blocked, which eventually causes the equipment breakdown.

Multiple nozzles gasifiers using synthesis gas down-flowing process also can be further expanded. Nevertheless, in order to fully utilizing the space in the chamber, usually the nozzles are arranged on the upper chamber where close to the top of the gasifiers, so during the reaction process, the high temperature gas and fluid cinder keeps eroding the top of the gasfiers chamber, may cause the temperature excursion on the top of the chamber so that it may potentially lead to safety issues.

SUMMARY OF INVENTION

One object of the present invention is to provide a large scale system of carbonaceous substance powder gasification. Another object of the present invention is to provide a method of carbonaceous substance powder gasification.

On one hand, the present invention provides a system of carbonaceous substance powder gasification, characterized in, includes a carbonaceous substance reaction device and a gas return device, said gas return device is used to mix the crude synthesis gas, which goes down from the said reaction device and has been cooled and primarily purified and then has been raised its pressure, with the high temperature crude synthesis gas which goes up from the said reaction device, so that the synthesis gas can be cooled.

The crude synthesis gas which goes down is mainly used for preventing the slagblock, at the same time, the low temperature humid synthesis gas which has been cooled is raised its pressure and fed into the primary cooling device, then it can be used as the cooling material to lower the temperature of the up going crude synthesis gas. In the present invention, the cooling material can also be water, water mist, water with the inert gas ($CO_2$, $N_2$), water with synthesis gas, synthesis gas. In the present invention, cooling is mainly realized by exchanging the heat with the cooling materials. Purifying is realized mainly by utilizing gravity, inertial force to separate the gas and particles.

Lowering the temperature is meant to spray in certain amount of cooling material to lower the temperature of the mixed gas till a certain point (Ex. 900° C.); cooling means to spray in excessive amount of cooling material, sufficiently exchanges the heat with the gas, so the temperature difference of before the cooling and after the cooling would be even bigger.

Purifying includes eliminating the dust and liquid drops in the synthesis gas, and eliminating the dust does not include eliminating water.

According to one embodiment of the present system, said carbonaceous substance reaction device includes the gasification reaction part or section, an upper gas outlet and a bottom gas outlet.

According to the one embodiment of the present system, part or all of the crude synthesis gas which flows out from the bottom gas outlet, after it is been cooled and preliminarily purified, flow along the pipe to the gas return device in order that its pressure is raised, and then mixes with the up going crude synthesis gas flowing out from the reaction part.

According to another embodiment of the present system, wherein the carbonaceous substance reaction device also includes a bottom cooling purification part or section to cool and preliminary purify the downstream high temperature crude synthesis gas which flows out from the reaction device; the inlet of the bottom cooling purification part is connected with the bottom outlet of the gasification reaction part, the synthesis gas outlet is arranged at the up middle part of the bottom cooling purification part.

The synthesis gas outlet of the bottom cooling purification part and the bottom outlet of the system can be the same one.

According to one embodiment of the present system, wherein the bottom cooling purification part also includes a rapid cooling device, a slag pool, and a slag outlet.

According to one embodiment of the present system, wherein said gas return device includes a coarse slag separator and an aerostatic press machine, the inlet of the said coarse slag separator is connected to the synthesis gas outlet of said bottom cooling purification part using a pipe, said aerostatic press machine is used to raise the pressure of the cooled crude synthesis gas so that part or all of the gas can be inserted into the system at a pressure which is 0.1 MPa to 6 MPa higher than that the upward moving gas by means of the primary cooling device or by means of the upstream rapid cooling device.

At this point, the pressed crude synthesis gas has a low temperature and contains certain amount of water, so it can act as the cooling material, which can lower the energy consumption and minimize the water consumption.

According to one embodiment of the present system, the number of said aerostatic press machine can be 1 to 10, preferably 2 to 5.

According to one embodiment of the present system, said carbonaceous substance reaction device also includes a cooling reaction part or section, which is set on the up middle part of the device, and its inlet is connected with the upper outlet of the gasification reaction part.

According to one embodiment of the present system, a primary cooling device is set at the inlet of the said cooling reaction part and the upper outlet of the gasification reaction part, so that the low temperature humid crude synthesis gas, the pressure of which has been raised by the said aerostatic press machine, can be sprayed into and mix with the up going high temperature crude synthesis gas which carries flying ash. So on one hand, cooling the up going high temperature crude synthesis gas which carries ash till the temperature t2 (softening temperature of the ash), which is lower enough to make the ash to lose its viscosity, and on the other hand, supplementing the reaction substance, to further proceed the carbon gasification reaction in the ash at the cooling reaction part, so that the hydrogen-carbon ratio of the synthesis gas can be raised. At this point, said ash is the flying ashes.

The crude synthesis gas which has been purified by the bottom cooling purification part, usually contains slag which is relatively big or coarse particles, after the slag is removed by the coarse slag separator, the crude synthesis gas which carries the water and small ash is pressed by the aerostatic press machine and transported to the primary cooling device serving as the cooling material, so it can cool the crude synthesis gas which enters into the cooling reaction part, and take part in the cooling reaction.

According to one embodiment of the present system, said carbonaceous substance reaction device also includes a upper cooling purification part or section, in the scenario where in the device the cooling reaction part is included, its inlet is connected with the upper outlet of the cooling reaction part; while when the cooling reaction part is not included, its inlet is connected with the upper outlet of the gasification reaction part, and is connected with the outlet of the gas return device.

According to one embodiment of the present system, said upper cooling purification part includes an upstream rapid cooling device, ash pool, and synthesis gas outlet, wherein the synthesis gas outlet is located at the up middle part of the upper cooling purity part, and the number of the synthesis gas outlet can be one or more than one, preferably 1 to 3. In the upper cooling purification device, the synthesis gas first will be rapidly cooled, then after one time or multiple times of cooling and purifying, be sent to the following procedure.

According to one embodiment of the present system, wherein the gasification reaction part has multiple nozzles which are circumferentially arranged (preferably evenly arranged), said nozzles can be arranged on one layer or level, or multiple layers or levels up and down, preferably 1 to 3 layers or levels.

On the other hand, the present invention provides a method of carbonaceous substance gasification, characterized in, including the following steps:

The carbonaceous substance and the gasifying agent react in the gasification reaction part, generate the crude synthesis gas whose main components are CO and H2, and the ash and slag in which the main component is inorganic matter; one part of the high temperature crude synthesis gas goes down with flying ash and fluid slag, the other part goes up with flying ash.

I: The part of the high temperature crude synthesis gas which goes down with the ash and slag will be cooled and preliminarily purified, then be sent to the coarse slag separator, the humid crude synthesis gas, the pressure of which is raised by the aerostatic press machine, is injected into the system by means of the primary cooling device or by means of the rapid cooling device, and then mixes with the up going high temperature crude synthesis gas; the going down fluid slag will be quenched and exhausted from the equipment;

II: The rest of the high temperature crude synthesis gas goes up with the flying ash, mixes with the low temperature humid crude synthesis gas which is sprayed by means of the primary cooling device, and is cooled down to 900° C. to t2 until the ash lost its viscosity, and at the same time makes sure that the H2O which enters into the cooling reaction part or section can further react with the rest of the carbon, so as to improve the carbon conversion and raise the hydrogen-carbon ratio.

After the reaction, the cooled crude synthesis gas keeps going up and passing the upstream rapid cooling device to be rapidly cooled, then enters into the upper cooling part to be cooled again and to eliminate the ash, to get the crude synthesis gas that satisfy the following procedures need.

In the detailed method of carbonaceous substance gasification, characterized in, including the following steps:

Using nozzles to spray the carbonaceous substance and the gasification agent into the gasification reaction part of the device, in the environment of high temperature (1200° C. to 2000° C.) and high pressure (0.1 MPa to 11 MPa), the carbonaceous substance and the gasification agent rapidly react and generate the crude synthesis gas in which the main components are CO and H2 and the ashes and slag in which main components is inorganic substance;

Part of the high temperature crude synthesis gas and most of the ashes and slag flow down into the bottom primary cooling device, the crude synthesis gas which has been cooled and purified goes through coarse slag separator, get the big particle slag removed, is raised its pressure by the aerostatic press machine and is delivered to the cooling reaction part, and the quenched ashes and slag are exhausted from the equipment through the slag exit, wherein, said "most of" is for instance more than 50%, preferably more than 55%, preferably more than 60%, preferably more than 65%, preferably more than 70%, preferably more than 75%, preferably more than 80%, preferably more than 85%, etc.;

Most of the high temperature crude synthesis gas and the high temperature flying ashes go up and mix with the cooling material, so they are cooled and then enter into the cooling reaction part, at this stage, the carbon which is not fully reacted will again react with the supplemented H2O, then further improve the carbon conversion and lower the temperature, and the ratio of hydrogen-carbon is also raised.

The crude synthesis gas after the reaction goes up with the flying ashes, after being rapidly cooled, goes into the upper cooling purification part, after being cooled and purified, the flying ashes in the crude synthesis gas is eliminated, so the low temperature crude synthesis gas which is relatively clean, will be sent to the following procedures.

In the present invention, said rapid reaction refers to the reaction which finishes in less than 10 seconds, 90% of the reaction finishes in 5 seconds.

The method of present invention can be proceeded in any suitable systems, preferably in the system of present invention.

The present invention with the aforementioned technical solution, has notable technical effects:

1. Since the gas return device is added, the heat efficiency is effectively improved, and the energy consumption of the device is lowered, and at the same time the system reduces the water consumption, reduces the humid and ashes in the synthesis gas, minimizes the burden for the following procedures.
2. The present invention uses a structure where the crude synthesis gas can exit from both the top and the bottom of the device, so on one hand to avoid the slagblock at the slag exit which otherwise happens when using only the upper gas exit solution, and on the other hand, to avoid the temperature excursion on the top of the device which otherwise occurs when using only the bottom gas exit solution;
3. The present invention uses multiple nozzles arrangement, which is favourable for full reaction and the maximizing of the equipment;
4. Since the cooling reaction part is added, the carbon conversion is improved, the ratio of hydrogen-carbon is raised, and at the same time the heat efficiency of the gasification reaction is also raised.

BRIEF DESCRIPTION OF THE FIGURES

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
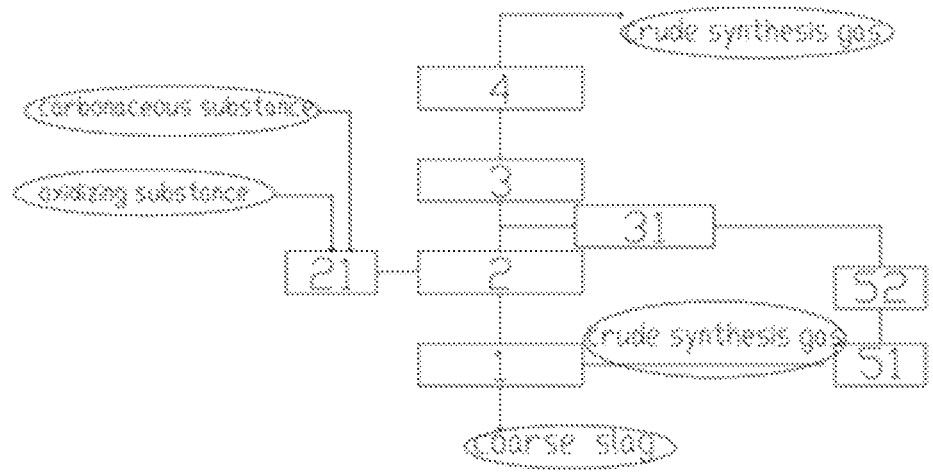
FIG. 1 is an illustrative view of the gasification method of the present invention.

Exemplary embodiments of the present disclosure will be described hereinafter in detail with reference to the attached drawings, wherein the same reference numerals refer to the same elements.

EXAMPLE 1

As shown in FIG. 1, a method of carbonaceous substance powder gasification, characterize in, including the following steps:
Using nozzle 21 to spray the pulverized coal with oxygen into the gasification reaction part 2 of the equipment, in the environment of high temperature (1200° C. degree to 2000° C. degree) high pressure (4.5 MPa), they rapidly reacts, and creates crude synthesis gas whose main components are CO and H2 and ashes and slag whose main components is inorganic substance.
Part of the high temperature crude synthesis gas and most of the ashes and slag flow down into the bottom cooling purification part 1, the quenched slag is exhausted from the equipment through the slag exit, the cleaned crude synthesis gas which contains water and ashes, flows through the coarse slag separator 51 to get the big particle slag removed, is raised its pressure by the aerostatic press machine 52 and is delivered to the primary cooling device 31 to serve as the cooling material and the gasifying agent.
Another part of the high temperature crude synthesis gas and the high temperature flying ashes flow up and mix with the cooling material sprayed into by means of the primary cooling device 31 to lower the temperature and then flow into the cooling reaction part 3. The residual carbon that has not been consumed will react with the supplemented H2O in cooling reaction part 3, which further enhance the conversion of the carbon, lower the temperature at the same time, and raise the hydrogen-carbon ratio of the synthesis gas.
After the reaction, the crude synthesis gas and the flying ash keep flowing up, is rapidly cooled, and then go into the upper cooling purification part 4, after the cooling and purifying, the low temperature relatively clean crude synthesis gas in which the flying ash has been removed, then are transferred to the next procedure.

EXAMPLE 2

Figure 2:
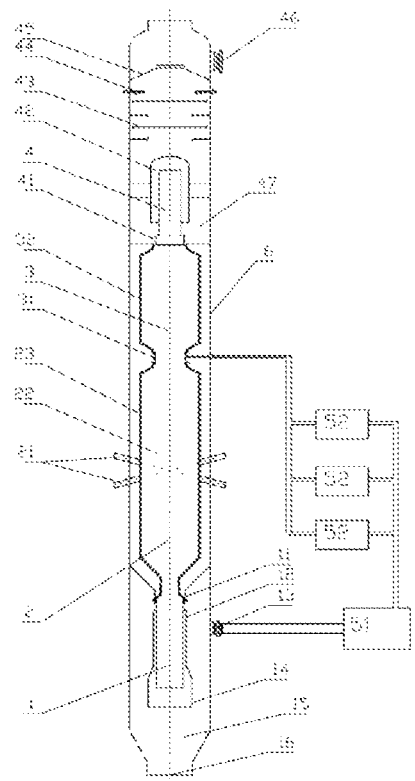
FIG. 2 is an illustrative view of a system of the present invention.
The numbers in the drawings indicate:
1. bottom cooling purification part or section; 11. downwards rapid cooling device; 12. downstream pipe; 13, bottom synthesis gas outlet; 14. upstream pipe; 15. slag pool; 16. slag outlet; 2. gasification reaction part or section; 21. nozzle; 22. gasification chamber; 23. gasification chamber water cooling wall; 3. cooling reaction part or section; 31. primary cooling device; 4. upper cooling purification part or section; 41. upstream rapid cooling device; 42. baffle pipe; 43. baffle device; 44. spray device; 45. segregation device; 46. upper synthesis gas outlet; 47. ash pool; 5. gas return device; 51. coarse slag separator; 52. aerostatic press machine; 6. shell.

See FIG. 2, a large scale system of carbonaceous substance gasification, characterized in, includes a carbonaceous substance reaction device, and a gas return device.
Said carbonaceous substance reaction device includes a bottom cooling purification part 1, gasification reaction part 2, a cooling reaction part 3, an upper cooling purification part 4, and a shell 6.
Said bottom cooling purification part 1 is set at the bottom of the device, its inlet is connected with the lower outlet of gasification reaction part 2. Said bottom cooling purification part 1 includes a downwards rapid cooling device 11, a downstream pipe 12, a bottom synthesis gas outlet 13, an upstream pipe 14, a slag pool 15, a slag outlet 16, etc.
Said gasification reaction part 2 is set at the lower part from the middle of the device. Eight nozzles 21 are arranged around the periphery of gasification reaction part 2, nozzles 21 can be arranged on one layer or level. The bottom outlet of said gasification reaction part 2 is connected with the bottom cooling purification part 1, and its upper outlet is connected with the cooling reaction part 3.
Said nozzle 21 is arranged so that the sprayed reactant can go in a path which creates a rotary cut (relative to the axis of the nozzle, tangent with a same circle).
Said cooling reaction part 3 is set on the upper part from the middle of the device. Its inlet is connected with the upper outlet of the gasification reaction part. A primary cooling device 31 is arranged at the connected part, to spray a proper amount of moisturized low temperature crude synthesis gas into the crude synthesis gas, so on one hand cooling the gas, and on the other hand complementing the reactant, to further proceed the carbon gasification reaction in the cooling reaction part, so that the hydrogen-carbon ratio of the synthesis gas can be increased.
After the reaction, the crude synthesis gas keeps going up, passing through the upper cooling purification device 4 and then is transferred to the follow up procedures.
Said upper cooling purification part 4 is set on the top of the device, its inlet is connected with the outlet of the cooling reaction part. The going up high temperature crude synthesis gas sequentially passes through the upstream rapid cooling device 41, baffle pipe 42, ash pool 47, baffle device 43, spray device 44, segregation device 45, upper synthesis gas outlet 46, etc. so it can be cooled, moisturized, and purified (moisture and ash are removed).

Said gas return device 5 includes a coarse slag separator 51, an aerostatic press machine 52 etc. The inlet of the said coarse slag separator 51 is connected via pipe with the synthesis gas outlet 13 of the bottom cooling purification part 1. The number of the aerostatic press machine 52 can be one or more than one, preferably three. The crude synthesis gas which has passed through the bottom cooling purification part 1, still contains big particle slag. After the big particle slag has been removed by the coarse slag separator 51, the crude synthesis gas which contains moisture and fine particle ash will be pumped by the aerostatic press machine 52 to the primary cooling device 31, so it can be used as the cooling material to cool off the crude synthesis gas which enters into the cooling reaction part and take part in the cooling reaction.

What is claimed is:

1. A carbonaceous substance powder gasification system, comprising a) a carbonaceous substance reaction device for the production of a crude synthesis gas, and b) a gas return device adapted for mixing i) crude synthesis gas which flows downward from said reaction device with cooling, preliminary purification and an increase in pressure, with ii) higher temperature crude synthesis gas which flows upward from said reaction device.

2. The carbonaceous substance powder gasification system according to claim 1, wherein said carbonaceous substance reaction device includes a gasification reaction section having a gas inlet at the top and a gas outlet at the bottom of the gasification reaction section.

3. The carbonaceous substance powder gasification system according to claim 2, wherein part or all of the crude synthesis gas which flows out from the gas outlet at the bottom of the gasification reaction section, after being cooled and preliminarily purified, flows through said gas return device with an increase in pressure, then mixes with the higher temperature crude synthesis gas which flows upward from said reaction device.

4. The carbonaceous substance powder gasification system according to claim 3, wherein said carbonaceous substance reaction device comprises a bottom cooling purification section, to cool and preliminarily purify the descending crude synthesis gas flowing out of the gas outlet at the bottom of the gasification reaction section, wherein the inlet of the bottom cooling purification section is connected to the bottom gas outlet of the gasification reaction section and a synthesis gas outlet of the bottom cooling purification section is connected to an upper-middle section of the the carbonaceous substance reaction device.

5. The carbonaceous substance powder gasification system according to claim 4, wherein the bottom cooling purification section comprises a rapid cooling device, a slag pool, and a slag outlet.

6. The carbonaceous substance powder gasification system according to claim 4, wherein said gas return device includes a coarse slag separator comprising an inlet and one or more aerostatic press machines, the inlet of said coarse slag separator being connected to the synthesis gas outlet of said bottom cooling purification section, wherein said one or more aerostatic press machines raises the pressure of the cooled crude synthesis gas from the course slag separator so that part or all of the gas is injected into the upper-middle section of the the carbonaceous substance reaction device at a pressure which is 0.1 MPa to 6 MPa higher than that of the upward moving synthesis gas.

7. The carbonaceous substance powder gasification system according to claim 6, wherein the number of aerostatic press machines is 1 to 10.

8. The carbonaceous substance powder gasification system according to claim 7, wherein the number of aerostatic press machines is 2 to 5.

9. The carbonaceous substance powder gasification system according to claim 6, wherein, said carbonaceous substance reaction device comprises a cooling reaction section, which is set in the upper-middle part of the reaction device, comprising an inlet which is connected with an upper outlet of the gasification reaction section.

10. The carbonaceous substance powder gasification system according to claim 9, wherein the inlet of said cooling reaction section comprises a primary cooling device which is disposed at the inlet of said cooling reaction section and the upper outlet of the gasification reaction section, so that low temperature moist crude synthesis gas from the one or more aerostatic press machines, the pressure of which has been raised by said one or more aerostatic press machines, is sprayed into and mixed with the upward-moving high temperature crude synthesis gas which further comprises ash, thereby cooling the upward moving high temperature ash-containing crude synthesis gas to a temperature between 900° C. and the softening temperature of the ash, causing the ash to lose its viscosity, and supplementing a reaction of said crude synthesis gas to continue carbon gasification of suspended ash in the cooling reaction section, thereby increasing the hydrogen:carbon ratio of a product synthesis gas.

11. The carbonaceous substance powder gasification system according to claim 9, wherein said carbonaceous substance reaction device comprises an upper cooling purification section comprising an inlet which is connected with an upper outlet of the cooling reaction section.

12. The carbonaceous substance powder gasification system according to claim 11, wherein said upper cooling purification section comprises an upstream rapid cooling device, an ash pool, and at least one synthesis gas outlet, wherein the at least one synthesis gas outlet is located at the upper-middle part of the upper cooling section.

13. The carbonaceous substance powder gasification system according to claim 12, wherein the number of synthesis gas outlets is 1 to 3.

14. The carbonaceous substance powder gasification system according to claim 2, wherein the gasification reaction section has multiple nozzles which are evenly configured around a circumference of the gasification reaction section, said nozzles being configured at one or more levels in the gasification reaction section.

15. The carbonaceous substance powder gasification system according to claim 14, wherein the nozzles are arranged in 1 to 3 levels.

16. A method of carbonaceous substance powder gasification, comprising the following steps:
  in the carbonaceous substance gasification system of claim 12:
  a) reacting a carbonaceous substance and a gasifying agent at high temperature in the gasification reaction section to generate a high-temperature crude synthesis gas comprising CO, H2, ash and slag; wherein one portion of the high temperature crude synthesis gas descends with the ash and fluid slag, and one portion ascends with the ash in said gasification system;
  b) cooling the high temperature crude synthesis gas portion which descends with the ash and slag;
  c) partially purifying the cooled descending portion and submitting the partially purified synthesis gas to the coarse slag separator to remove coarse ash in the coarse slag separator;

d) increasing the pressure of the coarse ash-removed partially purified descending portion by one or more aerostatic press machines;
e) injecting the higher pressure partially purified synthesis gas back into the system by means of a primary cooling device or by means of a rapid cooling device;
f) mixing the injected higher pressure cooled partially purified synthesis gas with the ascending high temperature crude synthesis gas to form a partially cooled synthesis gas mixture; wherein the ascending portion of the high temperature crude synthesis gas upon mixing with the higher pressure cooled partially purified synthesis gas, is cooled to between 900° C. and the softening temperature of the ash whereby the ash loses its viscosity;
g) optionally entering the cooling reaction section; wherein remaining carbon in the partially cooled crude synthesis gas further reacts in the cooling reaction section thereby improving the carbon conversion and raising the hydrogen-carbon ratio;
h) further entering into the upper cooling purification section to be cooled again and eliminate the ash, providing crude synthesis gas that satisfies the requirements of all subsequent procedures; and
i) quenching the descending fluid slag and exhausting it from the system.

\* \* \* \* \*